United States Patent
Yamane (10) Patent No.: US 6,612,415 B2
(45) Date of Patent: Sep. 2, 2003

(54) FRICTION MEMBER AND METHOD OF MANUFACTURE

(75) Inventor: Takeshi Yamane, Gunma-ken (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/918,564

(22) Filed: Aug. 1, 2001

(65) Prior Publication Data

US 2002/0033315 A1 Mar. 21, 2002

(30) Foreign Application Priority Data

Aug. 1, 2000 (JP) ........................... 2000-232603

(51) Int. Cl.⁷ .............................................. F16D 69/04
(52) U.S. Cl. ............................. 192/107 M; 188/251 A; 156/153; 156/281
(58) Field of Search ....................... 192/107 M, 107 R, 192/70.14; 188/251 R, 251 A; 156/153, 281

(56) References Cited

U.S. PATENT DOCUMENTS 5,236,528 A * 8/1993 Nakagawa ................. 156/153
5,516,587 A * 5/1996 Tanaka et al. .............. 428/460

FOREIGN PATENT DOCUMENTS

| JP | 58-160638 A | * | 9/1983 |
| JP | A5346129 | | 12/1993 |
| JP | A7293615 | | 11/1995 |
| JP | A1113802 | | 1/1999 |

* cited by examiner

*Primary Examiner*—Richard M. Lorence
(74) *Attorney, Agent, or Firm*—Birch, Stewart, Kolasch & Birch, LLP

(57) ABSTRACT

A friction member is made up of a back plate, a non-asbestos friction material bonded to a surface of the back plate and produced by molding and curing a non-asbestos friction material composition, and a metal phosphate conversion coating formed between the back plate and the non-asbestos friction material. When new, the friction member has a breaking load, measured according to JIS D4422, of at least 9 MPa, and a percent bonded surface area, which is the ratio of the surface area of friction material attached to the back plate surface after shear to the surface area of friction material attached to the plate surface before shear, of at least 90%. Such friction members are highly resistant to rusting, have excellent adhesion and heat resistance, and can be produced with minimal sludge formation and easy process control.

19 Claims, 1 Drawing Sheet

FIG.1

FRICTION MEMBER AND METHOD OF MANUFACTURE

BACKGROUND OF THE INVENTION

1. Field of the Invention

The present invention relates to friction members having an excellent bond strength and a high resistance to rusting, and to a method of manufacturing such friction members. More particularly, the invention relates to friction members, and a method of manufacture thereof, which are highly suitable for use in such applications as disk brake pads, drum brake shoes and clutch disks in brakes and clutches for automobiles, industrial machinery and other equipment.

2. Prior Art

Friction members used as disk pads for disk brakes and related applications in equipment such as automobiles are typically manufactured by placing a friction material preform on an iron or aluminum back plate that has been degreased, surface treated and coated with adhesive, then molding the preform in this state within a mold and subsequently heat-treating, spray-painting, baking and grinding so as to give a finished friction member in which the friction material is bonded to the surface of the back plate.

When rust forms on the surface of the metal back plate in such a friction member, the bond strength between the plate and the friction material decreases.

Surface treatments of the back plate that have been proposed to overcome this problem include the formation of a 5 to 20 $\mu$m thick metal (iron, zinc, calcium, manganese) phosphate coating (JP-A 5-346129), a calcium zinc phosphate coating having a coating weight of 2 to 6 $g/m^2$ (JP-A 7-293615), or a 0.2 to 2 $\mu$m thick iron phosphate coating (JP-A 11-13802).

However, zinc phosphate-type coatings have a large crystal size and are quite thick, making them subject to a decline in bond strength, particularly at high temperatures. Iron phosphate-type coatings also have major drawbacks. In addition to having a poor rust preventability, they are non-crystalline. As a result, the coatings are thin and scratch easily, so that process control is difficult.

An additional consideration is that, during brake or clutch operation, kinetic energy is converted to thermal energy due to friction, generating high temperatures and repeatedly subjecting the friction member to high thermal loads. Such thermal loading in friction materials is rising ever higher as the speed and performance of automobiles continues to increase. A desire thus exists for friction members which have a good heat resistance and are not subject to a decline in adhesion even with repeated and intense thermal cycling.

SUMMARY OF THE INVENTION

Therefore, the object of the present invention is to provide friction members which have a high resistance to rusting, excellent adhesion and heat resistance, a long service life, and can be produced with minimal sludge formation and easy process control. Another object of the invention is to provide a method of manufacturing such friction members.

I have found that high-quality friction members endowed with high resistance to rusting and excellent adhesion and heat resistance can be obtained by forming a zinc phosphate or calcium zinc phosphate conversion coating having a small crystal size, an optimized crystal shape, and a low coating thickness, and thus a low coating weight, between a back plate and a non-asbestos friction material which is bonded to a surface of the back plate and produced by molding and curing a composition made up primarily of a fibrous base, a binder and a filler. In addition, I have also found that because the conversion treatment agent has a high reactivity, treatment of relatively short duration is possible at low temperatures, resulting in minimal sludge generation and easy process control.

Accordingly, in a first aspect, the invention provides a friction member having a back plate; a non-asbestos friction material bonded to a surface of the back plate and produced by molding and curing a composition that includes a fibrous base, a binder and a filler; and a metal phosphate conversion coating formed between the back plate and the non-asbestos friction material. When new, the friction member has a breaking load, as measured in accordance with JIS D4422, of at least 9 MPa, and has a percent bonded surface area, defined as the ratio of the surface area of friction material attached to the back plate surface after shear to the surface area of friction material attached to the plate surface before shear, of at least 90%.

In a second aspect, the invention similarly provides a friction member having a back plate; a non-asbestos friction material bonded to a surface of the back plate and produced by molding and curing a composition that includes a fibrous base, a binder and a filler; and a metal phosphate conversion coating formed between the back plate and the non-asbestos friction material. After a 24-hour thermal history at 300° C., the friction member according to this aspect of the invention has a breaking load, as measured in accordance with JIS D4422, of at least 6 MPa, and has a percent bonded surface area, defined as the ratio of the surface area of friction material attached to the back plate surface after shear to the surface area of friction material attached to the plate surface before shear, of at least 50%.

In a third aspect, the invention similarly provides a friction member having a back plate; a non-asbestos friction material bonded to a surface of the back plate and produced by molding and curing a composition that includes a fibrous base, a binder and a filler; and a metal phosphate conversion coating formed between the back plate and the non-asbestos friction material. After a rusting test, the friction member according to this aspect of the invention has a breaking load, as measured in accordance with JIS D4422, of at least 7 MPa, and has a percent rusted surface area, defined as the ratio of the rusted surface area on the back plate to the total surface area of the plate, of at most 10%.

In a fourth aspect, the invention provides a friction member having a back plate; a non-asbestos friction material bonded to a surface of the back plate and produced by molding and curing a composition that includes a fibrous base, a binder and a filler; and a zinc phosphate conversion coating formed between the back plate and the non-asbestos friction material. In this aspect of the invention, the conversion coating is composed of crystals having a maximum length of 0.1 to 50 $\mu$m and an aspect ratio of 1/1 to 1/10, has a coating weight of 0.5 to 20 $g/m^2$, and has a phosphophyllite ratio P/(P+H), based on phosphophyllite crystals (P) and hopeite crystals (H) therein, of 0.1 to 1.

In a fifth aspect, the invention provides a friction member having a back plate; a non-asbestos friction material bonded to a surface of the back plate and produced by molding and curing a composition that includes a fibrous base, a binder and a filler; and a calcium zinc phosphate conversion coating formed between the back plate and the non-asbestos friction material. In this aspect of the invention, the conversion coating is composed of crystals having a maximum length of 0.1 to 50 μm and an aspect ratio of 1/1 to 1/10, and has a coating weight of 0.5 to 20 g/m².

In one embodiment of the friction member according to the above first, second or third aspect of the invention, the conversion coating is a zinc phosphate conversion coating which is composed of crystals having a maximum length of 0.1 to 50 μm and an aspect ratio of 1/1 to 1/10, has a coating weight of 0.5 to 20 g/m², and has a phosphophyllite ratio P/(P+H), based on phosphophyllite crystals (P) and hopeite crystals (H) therein, of 0.1 to 1.

In a second embodiment of the friction member according to the first, second or third aspect of the invention, the conversion coating is a calcium zinc phosphate conversion coating which is composed of crystals having a maximum length of 0.1 to 50 μm and an aspect ratio of 1/1 to 1/10, and has a coating weight of 0.5 to 20 g/m².

In a sixth aspect, the invention provides a method of manufacturing friction members, which method includes the steps of blasting a back plate to abrade it and remove rust therefrom; forming a metal phosphate conversion coating on a surface of the blasted back plate; and bonding to the conversion treated surface of the back plate a non-asbestos friction material produced by molding and curing a composition that includes a fibrous base, a binder and a filler. In the method of the invention, (a) the surface of the back plate is prepared with a surface preparation agent prior to the conversion coating formation step, (b) a conversion treatment solution containing a reaction modifier is used in the conversion coating formation step, or both (a) and (b) are carried out.

In the foregoing friction member manufacturing method of the invention, the surface preparation agent is preferably a titanium colloid-based formulation having an alkalinity of 0.5 to 7 points. Typically, at least one ionic species selected from the group consisting of $Ni^{2+}$, $F^-$ and $Mn^{2+}$ is used as the reaction modifier to form a zinc phosphate conversion coating, or $Ni^{2+}$ or $Mn^{2+}$ is used as the reaction modifier to form a calcium zinc phosphate conversion coating.

The blasting step in the method of the invention is preferably carried out by using high-pressure air to blow a slurry composed of an aqueous degreaser, an aqueous cleaner and particles of a greater hardness than the back plate surface against one surface of the back plate to be bonded with the friction material, or against all surfaces of the back plate, so as to abrade and remove rust from the plate.

In the practice of the invention, by forming a zinc phosphate or calcium zinc phosphate conversion coating having a small crystal size, an optimized crystal shape, and a low coating thickness, and thus a low coating weight, between a back plate and a non-asbestos friction material which is bonded to a surface of the back plate and produced by molding and curing a composition made up primarily of a fibrous base, a binder and a filler, there can be obtained high-quality friction members endowed with both excellent resistance to rusting and excellent adhesion even in a poor environment under high temperature and high humidity. Such friction members of the invention, when new, have a breaking load, as measured in accordance with JIS D4422, of at least 9 MPa and a percent bonded surface area, defined as the ratio of the surface area of friction material attached to the back plate surface after shear to the surface area of friction material attached to the plate surface before shear, of at least 90%; after a 24-hour thermal history at 300° C., have a breaking load of at least 6 MPa and a percent bonded surface area of at least 50%; and after a rusting test, have a breaking load of at least 7 MPa and a percent rusted surface area, defined as the ratio of the rusted surface area on the back plate to the total surface area of the plate, of at most 10%.

BRIEF DESCRIPTION OF THE DRAWING

The only FIGURE.

DETAILED DESCRIPTION OF THE INVENTION

The friction member of the invention is composed of a back plate; a non-asbestos friction material bonded to a surface of the back plate and produced by molding and curing a composition that includes a fibrous base, a binder and a filler; and a metal phosphate conversion coating formed between the back plate and the non-asbestos friction material.

When new, the friction member has a breaking load, as measured in accordance with JIS D4422, of at least 9 MPa, preferably 9 to 12 MPa, and most preferably 10 to 12 MPa. Moreover, it has a percent bonded surface area, defined as the ratio of the surface area of friction material attached to the back plate surface after shear to the surface area of friction material attached to the plate surface before shear, of at least 90%, preferably 90 to 100%, and most preferably 95 to 100%. Too small a breaking load makes the friction material subject to separation from the back plate under repeated stress during brake or clutch operation. Separation at the edges of the member allows oxygen and moisture in air to infiltrate, leading to rust formation on the plate and ultimately separation of the friction material from the plate due to rusting.

After a 24-hour thermal history at 300° C., the inventive friction member has a breaking load, as measured in accordance with JIS D4422, of at least 6 MPa, preferably 6 to 10 MPa, and most preferably 7 to 10 MPa. Moreover, it has a percent bonded surface area, as defined above, of at least 50%, preferably 60 to 100%, and most preferably 70 to 95%. A friction member which does not satisfy these conditions following the above thermal history undergoes deterioration of the coating layer with repeated use in a high-temperature environment and at high loading, and is unable to achieve the required bond strength.

After a rusting test, the inventive friction member has a breaking load, as measured in accordance with JIS D4422, of at least 7 MPa, preferably 7 to 12 MPa, and most preferably 8 to 11 MPa. Moreover, it has a percent rusted surface area, defined as the ratio of the rusted surface area on the back plate to the total surface area of the plate, of at most 10%, preferably at most 5%, and most preferably 0 to 5%. A friction member which does not satisfy these conditions following a rusting test, when used in a harsh, high-temperature, high-humidity environment or a poor environment such as muddy, unpaved roads or roads sprayed with deicing compounds, undergoes rusting which, as it proceeds, lowers the bond strength. In a worst-case scenario, the friction material may separate from the back plate and fall off. In the rusting test, the friction member is subjected to 20 test cycles, each cycle consisting of 72 hours of spraying with 5 wt % salt water at 50° C., 4 hours of drying at 70° C. and 20 hours of standing at 50° C. and 95% relative humidity.

Such a friction member can be produced by forming a zinc phosphate or calcium zinc phosphate conversion coating having a small crystal size, an optimized crystal shape and a low coating thickness, and thus a low coating weight, between a back plate and a non-asbestos friction material bonded to a surface of the back plate and produced by molding and curing a composition made up primarily of a fibrous base, a binder and a filler.

In the zinc phosphate or calcium zinc phosphate conversion coating, the crystals have a maximum length, determined as the average value for the longest edge of individual crystals measured on a scanning electron micrograph, of 0.1 to 50 $\mu$m, preferably 0.3 to 15 $\mu$m, more preferably 0.5 to 10 $\mu$m, and most preferably 1 to 6 $\mu$m.

The crystal shape is preferably spherical rather than needle-like. It is desirable for needle-like crystals to be of small diameter, preferably not more than 5 $\mu$m, and most preferably not more than 1 $\mu$m. The crystals have an aspect ratio (short edge/long edge), as determined by scanning electron microscopy, of 1/1 to 1/10, and preferably 1/1 to 1/5.

The coating weight, determined as the weight of material stripped with chromic acid (JIS K3151), is 0.5 to 20 $g/m^2$, preferably 0.5 to 6 $g/m^2$, more preferably 0.8 to 3.5 $g/m^2$, and most preferably 1.0 to 2.5 $g/m^2$.

When the chemical conversion coating is a zinc phosphate conversion coating, it has a phosphophyllite ratio P/(P+H), where P represents crystals of phosphophyllite ($Zn_2Fe(PO_4)_2 \cdot 4H_2O$) and H represents crystals of hopeite ($Zn_3(PO_4)_2 \cdot 4H_2O$), of 0.1 to 1, preferably 0.3 to 1, more preferably 0.7 to 1, and most preferably 0.8 to 1.

In the production of the above-described friction members of the invention, after the back plate has been wet blasted as needed, (a) the surface of the back plate is prepared with a surface preparation agent prior to the conversion coating formation step, (b) a conversion treatment solution containing a reaction modifier is used in the conversion coating formation step, or both (a) and (b) are carried out Any suitable back plate used in conventional friction members may be employed without particular limitation as the back plate in the invention. Exemplary plates include alloyed hot-dip galvanized steel plate, zinc electroplated steel plate, alloyed zinc electroplated steel plate, cold rolled steel plate, alloy plates composed of aluminum (including aluminum containing at least 1 wt % of a filler such as SiC or ceramic) with other metals, and metal or aluminum/magnesium alloy plates having an aluminum-based metallic surface.

Specific examples of suitable plates for this purpose include the following JIS grades: G3113 SAPH; G3134 SPFH; G3135 SPFC; G3131 SPHC, -D, -E and -HR; G3141 SPCC, -D and -E; G3302 SGH; G3313 SE; G3313 SEHC, -D and -E; G3313 SEFH; G3313 SEPH; G3101 SS; G3106 SM; G3111 SRB; G4051 SxxC and SxxCK (where "x" represents a digit from 0 to 9); G4104 SCr; G4103 SNCM; G4105 SCM; and G4102 SNC. Of these, the above-indicated JIS grades of G3113, G3134, G3135, G3131 and G3111 steel plate are preferred. G3113 is especially preferred. The steel plate preferably has a carbon content of not more than 0.3%, a silicon content of not more than 0.55%, phosphorus and sulfur contents of not more than 0.05% each, a chromium content of not more than 1.0%, and a nickel content of not more than 0.25%.

The surface preparation agent is preferably a substance capable of attaching base nuclei to the surface of the back plate. Titanium-based colloid particles having an average particle size of not more than 1 $\mu$m, and especially not more than 0.1 $\mu$m, are preferred. Phosphates and Jansted salts of titanium are most preferred.

Examples of suitable materials that may be used to arrive at such surface preparation agents are listed below.
(1) Titanium compounds such as titanium sulfate, titanium trichloride, titanium hydroxide, potassium titanyl oxalate, potassium titanyl chlorate, ammonium titanate, $TiBr_3 \cdot 6H_2O$, $TiF_4$, $TiF_3$, $TiI_2$ and $TiI_4$.
(2) Phosphoric acid and salts thereof, such as sodium and other alkali metal primary phosphates, ammonium primary phosphate, sodium and other alkali metal secondary phosphates, ammonium secondary phosphate, sodium and other alkali metal tertiary phosphates and ammonium tertiary phosphate.
(3) Pyrophosphoric acid and salts thereof, such as sodium and other alkali metal pyrophosphates, and ammonium pyrophosphate.
(4) Carbonic acid and salts thereof, including alkali metal carbonates and acidic alkali metal carbonates such as those in which the alkali metal is sodium, and acidic ammonium carbonates.
(5) Use can also be made of particles which bear a positive charge at an isoelectric point of 3 or less (pH 3 or less), such as silica, silica alumina, silica titania, silica zirconia, antimony oxide and acrylic particles. A nitrite may also be added insofar as the objects and effects of the invention can be attained.

Any suitable method may be used to prepare the surface preparation agent. In one typical method, titanium oxide is dissolved in sulfuric acid at a pH of 1, following which one or more compound selected from among phosphoric acid, alkali metal phosphates, polyphosphoric acid and alkali metal polyphosphates is added to the solution to form a slurry, which is then aged within a pH range of 6.5 to 9.5.

In the practice of the invention, it is advantageous to use the surface preparation agent at an alkalinity within a range of 0.5 to 7 points, and preferably 1.0 to 5 points. No particular limitation is imposed on the treatment conditions under which the surface preparation agent is used, although treatment at a temperature of 5 to 40° C. for a period of about 10 to 120 seconds is desirable Prolonging the duration of treatment to about several minutes does not pose any particular problem, although excessively long treatment is undesirable because it lowers the surface activity and leads to rusting.

The surface treatment agent may be a commercial product, suitable examples of which include Prefix 707 and 704 (both made by Nippon CB Chemical), Prepan-X and Prepan-Z (both made by Nihon Parkerizing Co., Ltd.), Grander-Finer 5 (made by Million Chemical Co., Ltd.), and Surffine 5N-HM (made by Nippon Paint Co., Ltd.).

The conversion treatment agent used in the invention contains the following ions (1) and (2) essential to the conversion treatment solution:
(1) 5,000 to 40,000 ppm of phosphate ions from compounds such as phosphoric acid, zinc phosphate and manganese phosphate;
(2) 100 to 10,000 ppm of zinc ions from compounds such as zinc oxide, zinc carbonate and zinc nitrate.

The conversion treatment agent used to form a calcium zinc phosphate conversion coating contains also the following calcium ions (3):
(3) 10 to 5,000 ppm of calcium ions from compounds such as calcium nitrate, calcium sulfate, calcium phosphate, calcium fluoride, calcium carbonate, calcium hydroxide and calcium chloride.

It is advantageous to add one or more reaction modifier from among those listed under (4) to (10) below to the conversion treatment agent.

(4) Preferably 100 to 3,000 ppm of manganese ions from compounds such as manganese carbonate, manganese nitrate, manganese chloride and manganese phosphate.

(5) Preferably 100 to 4,000 ppm of nickel ions from compounds such as nickel carbonate, nickel nitrate, nickel chloride and nickel phosphate.

(6) Preferably 50 to 2,000 ppm of tungsten ions from compounds such as sodium tungstate and ammonium tungstate.

(7) Preferably 100 to 4,000 ppm of cobalt ions from compounds such as cobalt nitrate, cobalt sulfate, cobalt phosphate, cobalt hydroxide, cobalt chloride and cobalt fluoride.

(8) Preferably 10 to 3,000 ppm of magnesium ions from compounds such as magnesium nitrate, magnesium sulfate, magnesium phosphate, magnesium fluoride, magnesium hydroxide and magnesium carbonate.

(9) Preferably 5 to 200 ppm of copper ions from compounds such as copper nitrate, copper chloride and copper sulfate.

(10) Preferably 50 to 4,000 ppm, and more preferably 50 to 1,000 ppm, of fluoride ions from compounds such as hydrofluoric acid and its sodium, potassium and ammonium salts, tetrafluoroboric acid and fluorosilicic acid, as well as their cobalt and zinc salts, sodium fluoride, potassium fluoride, and ammonium fluoride. The molar ratio of complex fluoride ions to simple fluoride ions in this case is preferably 0.01 to 0.5.

Of the above, the addition of one or more from among fluoride ions, manganese ions and nickel ions is particularly effective. It should be noted that, in a calcium zinc phosphate conversion treatment agent, fluoride ions cannot be used because they invite the formation of calcium fluoride sludge.

The metallic ions serving as the above reaction modifiers are partially taken up into the coating as crystals, but substantially none of the fluoride ion is taken up into the coating.

It is advantageous for the conversion treatment solution to include also the following as reaction accelerators:

(1) preferably 10 to 5,000 ppm of nitrite ions from compounds such as nitric acid, sodium nitrite and ammonium nitrite;

(2) preferably 50 to 5,000 ppm of m-benzenesulfonic acid ions from compounds such as sodium m-nitrobenzenesulfonate;

(3) preferably 100 to 100,000 ppm of aqueous hydrogen peroxide.

The following internal reaction accelerators are also preferably included:

(4) preferably 10 to 15,000 ppm of nitrate ions from compounds such as sodium nitrate, ammonium nitrate, zinc nitrate, manganese nitrate, nickel nitrate, cobalt nitrate, calcium nitrate, magnesium nitrate and copper nitrate;

(5) preferably 10 to 15,000 ppm of sulfate ions from compounds such as sulfuric acid, sodium sulfate, ammonium sulfate, zinc sulfate, manganese sulfate, nickel sulfate, cobalt sulfate, calcium sulfate, magnesium sulfate and copper sulfate;

(6) preferably 50 to 2,000 ppm of chlorite ions from compounds such as sodium chlorite and ammonium chlorite.

In working the invention, an amine-based rust preventive may be added to rinsing water, post-rinsing water or a hot water wash following conversion treatment.

Any of various techniques may be used to carry out conversion treatment, including spraying, dipping, spraying-dipping, half dipping, dipping-spraying, and intermittent spraying. A dipping technique is especially preferred.

The conditions of conversion treatment, such as temperature, concentration and time, vary empirically with such factors as stirring of the solution and flow rate of the spray. The temperature is typically adjusted as appropriate within a range of room temperature to 95° C., and preferably 30 to 80° C. In the case of a zinc phosphate conversion treatment agent, treatment is typically carried out at a temperature of up to 50° C. for a period of up to 180 seconds, and preferably at 30 to 50° C. for 120 to 180 seconds. In the case of a calcium zinc phosphate conversion treatment agent, treatment is typically carried out at a temperature of up to 70° C. for a period of up to 400 seconds, and preferably at 50 to 70° C. for 200 to 400 seconds. It is advantageous to adjust the concentration of the conversion treatment agent within a pH range of 2 to 5, and preferably 2.5 to 4. More specifically, a total oxygen level of 5 to 50 points, and preferably 15 to 35 points, and a free oxygen level of 0.1 to 10 points, and preferably 0.3 to 5 points, is desirable. In the practice of the invention, using a conversion treatment agent having a high reactivity enables treatment to be carried out at a low temperature and in a relatively short time. Treatment at a low temperature results in the generation of less sludge, thereby extending the service life of filters and reducing industrial waste.

Commercial products may be used as the conversion treatment agent. Examples of suitable commercial zinc phosphate conversion treatment agents include Chemibonder 5020, 304 and 306 (all made by Nippon CB Chemical), Palbond L3020, WL35, E3091 and N160 (all made by Nihon Parkerizing Co., Ltd.), Grander S-53A (made by Million Chemical Co., Ltd.), and Surffine SD2500 (made by Nippon Paint Co., Ltd.).

Examples of suitable commercial calcium zinc phosphate conversion treatment agents include Chemibonder 5011 (made by Nippon CB Chemical), Palbond 880 (made by Nihon Parkerizing Co., Ltd.), and Grander 4310 (made by Million Chemical Co., Ltd.).

Advantageous use can be made of either zinc phosphate or calcium zinc phosphate conversion treatment agents in working the invention, although zinc phosphate conversion treatment agents are preferred because they enable low-temperature treatment to be carried out and generate little sludge.

In working the invention, the rust resistance and adhesion can be enhanced by applying a primer to the conversion treated back plate, and curing (semi-curing) the primer. Preferred primers for this purpose are resol-type phenolic resins. The primer is typically baked at a temperature within a range of 150 to 250° C. and formed to a film thickness of 5 to 25 $\mu$m, and preferably 10 to 20 $\mu$m.

If necessary, an adhesive is applied over the primer, and preferably dried somewhat until free of tack, following which the friction material is press bonded thereon. Such an adhesive is desirable because it increases adhesion and improves rust resistance.

Figure 1:
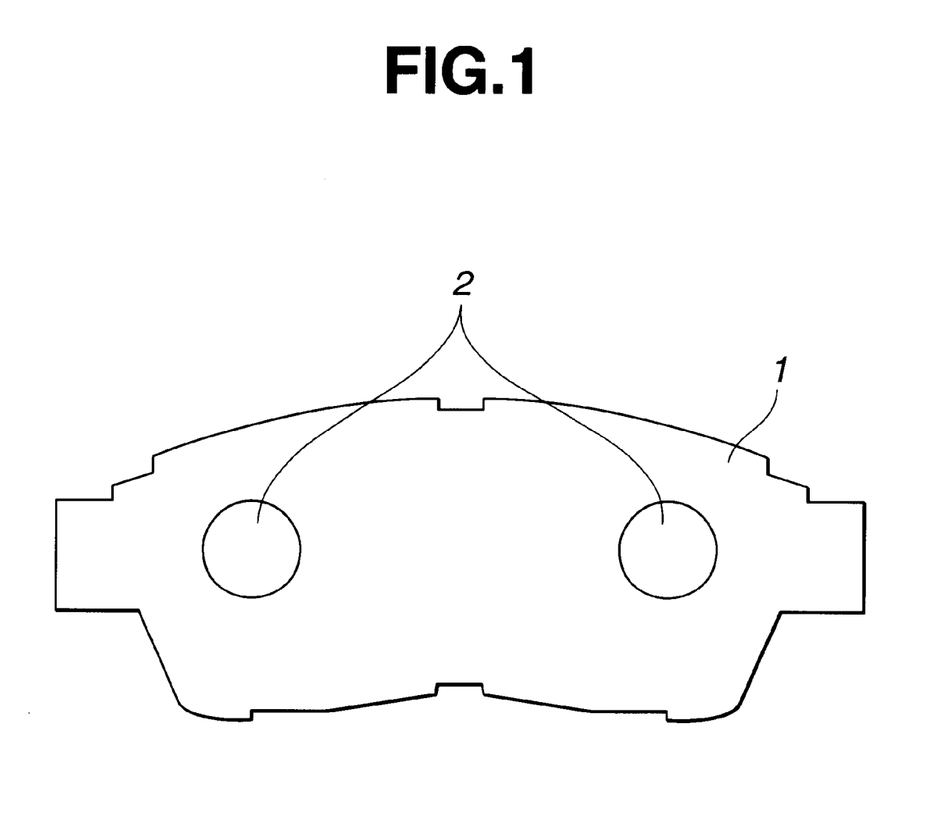
FIG. 1 is a plan view showing a back plate for a friction member according to one embodiment of the present invention.

Referring to FIG. 1, the back plate 1 generally bears from one to ten boss holes 2, each about 10 to 20 mm in diameter. Water infiltration can be prevented, thus extending the life of the product, by carrying out a treatment (i) in which the boss holes 2 are filled with a composition formulated from a low porosity, low water absorption material of a type commonly used in friction materials, wherein a thermoset resin such as phenolic resin, epoxy resin, melamine resin or urea resin, or a rubber such as silicone rubber, ethylene-propylene-diene terpolymer (EPDM), acrylic rubber or acrylonitrile-butadiene rubber (NBR), serves as the binder.

The product life can also be extended by another treatment (ii) in which the above-mentioned high strength, high bond strength, low porosity material is applied to a film thickness of 0.3 to 3 mm, and preferably 1 to 2 mm, onto the bonding surface between the friction material and the back plate.

In the practice of the invention, the rusting resistance can be enhanced and the product life extended by carrying out treatment (i) and/or (ii) together with the conversion treatment described above.

To ensure a good bond strength between the primer and the back plate, the surface of the back plate should have a certain degree of roughness. More specifically, it is advantageous for the back plate to have a surface roughness characterized by a ten-point average roughness Rz of 5 to 40 µm, and preferably 10 to 30 µm; and a roughness value Ra of 1 to 10 µm, and preferably 1.5 to 7 µm.

To ensure a back plate surface roughness of this order, it is generally desirable to finish the surface by a blasting process. Because aqueous degreasing is carried out, a wet blasting process is preferred. Wet blasting involves mixing particles (abrasive) of a greater hardness than the back plate surface together with an aqueous solution to form a slurry. The slurry is then blown together with high-pressure air against the surface of the back plate. Materials that may be used as the abrasive include particles of alumina, stainless steel, titanium oxide, silicon dioxide, zirconium oxide, titanium alloy, ceramics, SiN, boron nitride, SiC or TiC. Of these, stainless steel or titanium particles with rounded corners and a size of 0.1 to 3 mm, and especially 0.2 to 1 mm, are preferred.

Blasting the surface of the back plate in this way is desirable because it increases activity, provides good reactivity with the conversion coating, and removes rust and other undesirable matter initially present. Moreover, it increases the surface area of contact between the primer and the friction material.

A primer is then applied to the conversion treated back plate and cured (semi-cured). If necessary, an adhesive is applied over the primer and dried. Next, in accordance with a conventional method of manufacturing friction members, the friction material is bonded to the back plate such as by the application of pressure, after which heat treatment, coating, grinding of the friction surface and other appropriate steps are carried out to produce the friction member. Any suitable coating process may be used, although spray painting, powder coating and electrodeposition coating are preferred.

The non-asbestos friction material bonded to the back plate may be a conventional one produced by molding and curing a non-asbestos friction material composition composed primarily of (A) a fibrous base, (B) a binder and (C) a filler.

The fibrous base used as component (A) may be any organic fiber or inorganic fiber other than asbestos that is commonly used in friction materials. Illustrative examples of suitable fibrous bases include inorganic fibers such as metal fibers (e.g., iron, copper, brass, bronze, and aluminum), ceramic fibers, potassium titanate fibers, glass fibers, carbon fibers, rock wool, wollastonite, sepiolite, attapulgite, and artificial mineral fibers; and organic fibers such as aramid fibers, polyimide fibers, polyamide fibers, phenolic fibers, cellulose, and acrylic fibers. Any one or combination of two or more of these may be used.

The fibrous base may be used in the form of short fibers or a powder. It is included in an amount of preferably 5 to 90 wt %, and most preferably 20 to 70 wt %, based on the overall friction material composition.

The binder used as component (B) may be any known binder commonly used in friction materials. Illustrative examples include phenolic resins, melamine resins, epoxy resins, various rubber-modified phenolic resins, and NBR. Any one or combinations of two or more of these may be used.

The amount of binder (B) included in the composition is preferably 5 to 50 wt %, and most preferably 10 to 25 wt %, based on the overall friction material composition.

The filler used as component (C) may be a known organic or inorganic filler commonly used in friction materials. Illustrative examples include molybdenum disulfide, antimony trisulfide, calcium carbonate, barium sulfate, magnesium oxide, cashew dust, graphite, calcium hydroxide, calcium fluoride, talc, molybdenum trioxide, antimony trioxide, zirconium silicate, iron oxide, mica, iron sulfide, zirconium oxide, metal powder, quartz, silicon dioxide, rubber dust, alumina, chromium oxide, and vermiculite. These may be used alone or as combinations of two or more thereof.

The amount of filler (C) included in the composition is preferably 5 to 60 wt %, and most preferably 10 to 40 wt %, based on the overall friction material composition.

The method of manufacturing the friction member of the invention involves uniformly blending above components (A) to (C) in a suitable mixer such as a Henschel mixer, Loedige mixer or Eirich mixer to obtain a molding powder, and preforming the powder in a mold. The preform is then bonded to a back plate on which a metal phosphate conversion coating according to the invention has been formed, in which state the preform is molded at a temperature of 130 to 200° C. and a pressure of 100 to 1,000 kg/cm$^2$ for a period of 2 to 10 minutes.

The molded article is then postcured by heat-treating at 140 to 250° C. for 2 to 48 hours, an subsequently spray-painted, baked and grinded as needed, giving a finished friction member.

The friction members according to the invention are highly suitable for a variety of applications, including disk brake pads, drum brake shoes, clutch disks and brake shoes for brakes and clutches in automobiles, large trucks, railroad cars and various types of industrial machinery.

EXAMPLES

Examples and comparative examples are given below by way of illustration, and are not intended to limit the invention.

Examples 1 to 12

And Comparative Examples 1 to 4

Using the conversion treatment agents and, where necessary, surface preparation agents shown in Tables 1 to 3, a zinc phosphate coating (Examples 1 to 8, Comparative Examples 1 to 3) or a calcium zinc phosphate coating (Examples 9 to 12, Comparative Example 4) was formed on a degreased back plate 1 of the type shown in FIG. 1 (SAPH 440; surface area, 50 cm$^2$). The back plate 1 shown in FIG. 1 has two boss holes 2.

The total oxygen, free oxygen, accelerator concentration and surface preparation agent concentration shown in Tables 1 to 3 were measured as described below. The surface preparation agent used in the examples according to the invention had a particle size of not more than 0.1 µm, and the zinc ion concentration in the conversion treatment agents was in a range of 500 to 5,000 ppm. Other ion concentrations in the various conversion treatment agents and surface treatment agents used were within the indicated ranges.

Total Oxygen

The number of milliliters of 0.1 N sodium hydroxide required to titrate 10 ml of the treatment solution using phenolphthalein as the indicator was expressed in points, where 1 point is equal to 1 mL of 0.1 N sodium hydroxide.

Free Oxygen

The number of milliliters of 0.1 N sodium hydroxide required to titrate 10 ml of the treatment solution using Bromophenol Blue as the indicator was expressed in points, where 1 point is equal to 1 mL of 0.1 N sodium hydroxide.

Accelerator Concentration

Expressed as the volume in milliliters at 40° C. of nitrogen oxides when the nitrous acid in 50 mL of the solution is decomposed and converted to nitrogen oxides.

Surface Preparation Agent Concentration
(Alkalinity)

The number of milliliters of 0.1 N aqueous sulfuric acid required to titrate 10 ml of the treatment solution using Bromophenol Blue as the indicator was expressed in points, where 1 point is equal to 1 mL of 0.1 N aqueous sulfuric acid.

The crystal size, crystal shape (aspect ratio), coating weight, and phosphophyllite ratio for the coating in each example were measured as follows. The results are shown in Tables 1 to 3.

Crystal Size

Measured using scanning electron micrographs at an enlargement of 1,000×.

Crystal Shape (Aspect Ratio)

The aspect ratio was calculated as the (short edge)/(long edge) of crystals measured on a scanning electron micrograph at an enlargement of 1,000×.

Coating Weight

Determined as the weight of material stripped from the back plate using chromic acid, in accordance with JIS K3151.

Phosphophyllite Ratio, P/(P+H)

The intensity ratio in x-ray diffraction analysis (JIS K3151-1996) was computed as follows.

$$\frac{\text{intensity of (100) reflection by phosphophyllite crystals}}{\text{intensity of (100) reflection by phosphophyllite crystals} + \text{intensity of (100) reflection by hopeite crystals}}$$

Next, the friction material composition shown in Table 4 was formulated and blended, then preformed by a suitable process such as compression molding. The preform was placed in a mold heated to 140 to 180° C., and the back plate in each example was set in place for bonding with the molded article (friction material). The preform was then molded at a molding pressure of 250 kg/cm$^2$ for 2 to 5 minutes, and postcured by 5 hours of heat treatment at 200° C., yielding friction members, specifically disk brake pads, in each of Examples 1 to 12 and Comparative Examples 1 to 4.

The breaking load, percent bonded surface area, and percent rusted surface area of the resulting brake pads when new, after a thermal history (24 hours at 300° C.), and after a rusting test (in which the friction member was subjected to 20 cycles, each cycle consisting of 72 hours of spraying 5 wt % salt water at 50° C., 4 hours of drying at 70° C., and 20 hours of standing at 50° C. and 95% relative humidity) were measured as described below. The results are shown in Tables 1 to 3.

Breaking Load

The shear strength (in shear parallel to the plate) per unit surface area was measured in accordance with JIS D4422. A larger value indicates a higher bond strength.

Percent Bonded Surface Area

This is the ratio of the surface area of friction material attached to the back plate surface after shear with respect to the surface area of friction material attached to the plate surface before shear, expressed as a percentage. A larger value indicates a higher bond strength.

Percent Rusted Surface Area

This is the ratio of the rusted surface area on the back plate to the total surface area of the plate, expressed as a percentage.

TABLE 1

|  |  | Example |  |  |  |  |  |
|---|---|---|---|---|---|---|---|
|  |  | 1 | 2 | 3 | 4 | 5 | 6 |
| Crystal size ($\mu$m) |  | 3 to 5 | 4 to 8 | 1 to 4 | 2 to 5 | 1 to 5 | 3 to 7 |
| Crystal shape (aspect ratio) |  | 0.5 to 1 | 0.1 to 1 | 0.5 to 1 | 0.5 to 1 | 0.5 to 1 | 0.1 to 1 |
| Coating weight (g/m$^2$) |  | 3.2 | 5.1 | 7.4 | 3.9 | 3 | 8.1 |
| Phosphophyllite ratio (P/P + H) |  | 0.9 | 0.8 | 0.9 | 0.9 | 0.9 | 0.8 |
| Surface treatment agent | Product name | PF707 | — | PF707 | PL-X | PL-Z | — |
|  | Alkalinity (points) | 1.5 | — | 3 | 3 | 3 | — |
|  | Temperature (° C.) | 15 | — | 15 | 15 | 15 | — |
|  | Time (s) | 30 | — | 60 | 30 | 30 | — |
| Conversion treatment agent | Product name | Chemibonder 5020 | Chemibonder 304 | Chemibonder 5020 | Palbond L3020 | Palbond L3020 | Palbond L3020 |
|  | Total oxygen (points) | 22 | 30 | 22 | 22 | 21 | 23 |
|  | Free oxygen (points) | 1 | 3.5 | 1 | 1 | 1.2 | 1.2 |
|  | Accelerator conc. (ml) | 2.5 | 5 | 2.5 | 3 | 2.5 | 2 |
|  | Temperature (° C.) | 45 | 50 | 45 | 43 | 43 | 45 |
|  | Time (s) | 120 | 150 | 120 | 180 | 150 | 180 |
| When new | Breaking load (MPa) | 10.8 | 10.4 | 10.8 | 11.0 | 10.6 | 10.4 |
|  | Bonded surface area (%) | 100 | 100 | 100 | 100 | 100 | 100 |
| After heat | Breaking load (MPa) | 9.4 | 7.8 | 9.2 | 9.4 | 9.0 | 8.0 |

TABLE 1-continued

|  |  | Example | | | | | |
|---|---|---|---|---|---|---|---|
|  |  | 1 | 2 | 3 | 4 | 5 | 6 |
| history | Bonded surface area (%) | 90 | 85 | 95 | 90 | 85 | 80 |
| After rust | Breaking load (MPa) | 10.4 | 9.8 | 10.4 | 10.6 | 10.4 | 10.2 |
| test | Rusted surface area (%) | <1 | 3 | <1 | <1 | <1 | 4 |

PF707: Prefix 707, a titanium colloid-type surface treatment agent made by Nihon CB Chemical.

PL-X: Prepan-X, a non-titanium colloid-type surface treatment agent made by Nihon Parkerizing Co., Ltd.

PL-Z: Prepan-Z, a titanium colloid-type surface treatment agent made by Nihon Parkerizing Co., Ltd.

Chemibonder 5020: A zinc phosphate conversion treatment agent made by Nihon CB Chemical. Accelerator: nitrite ions. Reaction modifiers: $Ni^{2+}$, $Mn^{2+}$ and $F^-$.

Chemibonder 304: A zinc phosphate conversion treatment agent made by Nihon CB Chemical. Accelerator: nitrite ions. Reaction modifiers: $Ni^{2+}$, $Mn^{2+}$ and $F^-$.

Palbond L3020: A zinc phosphate conversion treatment agent made by Nihon Parkerizing Co., Ltd. Accelerator: nitrite ions. Reaction modifiers: $Ni^{2+}$, $Mn^{2+}$ and $F^-$.

Grander-Finer 5: A titanium-based surface preparation agent made by Million Chemical Co., Ltd.

Surffine 5N-HM: A titanium-based surface preparation agent made by Nippon Paint Co., Ltd.

Grander S-53A: A zinc phosphate conversion treatment agent made by Million Chemical Co., Ltd. Accelerator: nitrite ions. Reaction modifier: $Ni^{2+}$, $Mn^{2+}$ and $F^-$.

Surfdine SD2500: A zinc phosphate conversion treatment agent made by Nippon Paint Co., Ltd. Accelerator: nitrite ions. Reaction modifier: $Ni^{2+}$, $Mn^{2+}$ and $F^-$.

Chemibonder 303: A zinc phosphate conversion treatment agent made by Nihon CB Chemical. Accelerator: nitrite ions.

Grander S-50A: A zinc phosphate conversion treatment agent made by Million Chemical Co., Ltd. Accelerator: nitrite ions.

Palbond 147: A zinc phosphate conversion treatment agent made by Nihon Parkerizing Co., Ltd. Accelerator: nitrite ions.

TABLE 2

|  |  | Example | | Comparative Example | | |
|---|---|---|---|---|---|---|
|  |  | 7 | 8 | 1 | 2 | 3 |
| Crystal size ($\mu$m) |  | 2 to 5 | 2 to 7 | 40 to 50 | 10 to 15 | 40 to 50 |
| Crystal shape (aspect ratio) |  | 0.5 to 1 | 0.5 to 1 | 1/20 to 1/35 | 1/20 to 1/30 | 1/20 to 1/35 |
| Coating weight (g/m$^2$) |  | 3.5 | 2.3 | 8.5 | 14 | 3.5 |
| Phosphophyllite ratio (P/P + H) |  | 0.9 | 0.9 | 0.8 | 0.35 | 0.73 |
| Surface treatment agent | Product name | Grander-Finer 5 | Surffine 5N-HM | — | — | — |
|  | Alkalinity (points) | 3 | 3 | — | — | — |
|  | Temperature (° C.) | 15 | 15 | — | — | — |
|  | Time (s) | 60 | 60 | — | — | — |
| Conversion treatment agent | Product name | Grander S-53A | Surfdine SD2500 | Chemibonder 303 | Grander S-50A | Palbond 147 |
|  | Total oxygen (points) | 25 | 24 | 30 | 30 | 30 |
|  | Free oxygen (points) | 1 | 1 | 4 | 4 | 4 |
|  | Accelerator conc. (ml) | 3 | 3 | 5 | 5 | 5 |
|  | Temperature (° C.) | 45 | 45 | 55 | 55 | 55 |
|  | Time (s) | 120 | 180 | 180 | 180 | 180 |
| When new | Breaking load (MPa) | 10.6 | 10.8 | 8.2 | 7.2 | 7.6 |
|  | Bonded surface area (%) | 100 | 100 | 100 | 70 | 85 |
| After heat history | Breaking load (MPa) | 8.8 | 8.8 | 4.9 | 4.1 | 4.5 |
|  | Bonded surface area (%) | 90 | 90 | 30 | 15 | 20 |
| After rust test | Breaking load (MPa) | 9.8 | 10.2 | 6.3 | 4.9 | 3.9 |
|  | Rusted surface area (%) | <1 | <1 | 25 | 35 | 30 |

TABLE 3

|  |  | Example | | | | Comparative Example |
| --- | --- | --- | --- | --- | --- | --- |
|  |  | 9 | 10 | 11 | 12 | 4 |
| Crystal size ($\mu$m) | | 1 to 7 | 1 to 4 | 1 to 5 | 2 to 8 | 40 to 50 |
| Crystal shape (aspect ratio) | | 0.1 to 1 | 0.1 to 1 | 0.1 to 1 | 0.1 to 1 | 1/30 to 1/40 |
| Coating weight (g/m$^2$) | | 3 | 2.8 | 2 | 4.8 | 3.2 |
| Surface treatment agent | Product name | — | PF704 | — | — | — |
| | Alkalinity (points) | — | 3 | — | — | — |
| | Temperature (° C.) | — | 15 | — | — | — |
| | Time (s) | — | 60 | — | — | — |
| Conversion treatment agent | Product name | Chemibonder 5011 | Chemibonder 5011 | Palbond 880 | Grander 4310 | Chemibonder 5019 |
| | Total oxygen (points) | 34 | 34 | 34 | 34 | 45 |
| | Free oxygen (points) | 3 | 3 | 3 | 3 | 3 |
| | Temperature (° C.) | 70 | 70 | 70 | 70 | 85 |
| | Time (s) | 400 | 400 | 400 | 400 | 400 |
| When new | Breaking load (MPa) | 10.2 | 10.8 | 9.8 | 10.0 | 6.8 |
| | Bonded surface area (%) | 100 | 100 | 100 | 100 | 60 |
| After heat history | Breaking load (MPa) | 8.0 | 8.4 | 7.8 | 7.8 | 3.9 |
| | Bonded surface area (%) | 85 | 90 | 75 | 85 | 5 |
| After rust test | Breaking load (MPa) | 9.8 | 9.4 | 8.8 | 8.2 | 3.5 |
| | Rusted surface area (%) | 2 | <1 | 2 | 3 | 40 |

PF704: Prefix 704, a titanium colloid-type surface treatment agent made by Nihon CB Chemical.
Chemibonder 5011: A calcium zinc phosphate conversion treatment agent made by Nihon CB Chemical. Reaction modifier: $Ni^{2+}$, $Mn^{2+}$.
Palbond 880: A calcium zinc phosphate conversion treatment agent made by Nihon Parkerizing Co., Ltd. Reaction modifier: $Ni^{2+}$, $Mn^{2+}$.
Grander 4310: A calcium zinc phosphate conversion treatment agent made by Million Chemical Co., Ltd. Reaction modifier: $Ni^{2+}$, $Mn^{2+}$.
Chemibonder 5019: A calcium zinc phosphate conversion treatment agent made by Nihon CB Chemical.

TABLE 4

| Constituent | Weight % |
| --- | --- |
| Aramid fibers | 5 |
| Potassium titanate | 10 |
| Steel fiber | 20 |
| Barium sulfate | 20 |
| Graphite | 5 |
| Cashew dust | 10 |
| Calcium carbonate | 10 |
| Phenolic resin | 20 |
| Total | 100 |

As described above and shown in the examples, the invention can provide high-quality friction members which are highly resistant to rusting, have excellent adhesion and heat resistance, and can be produced with minimal sludge formation and easy process control. The friction members of the invention are highly suitable as disk brake pads, drum brake shoes and clutch disks for brakes and clutches in equipment such as automobiles and industrial machinery.

Japanese Patent Application No. 2000-232603 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A friction member comprising:

a back plate, a non-asbestos friction material bonded to a surface of the back plate and produced by molding and curing a composition that includes a fibrous base, a binder and a filler, and a zinc phosphate conversion coating formed between the back plate and the non-asbestos friction material;

wherein the conversion coating is composed of crystals having a maximum length of 0.1 to 50 $\mu$m and an aspect ratio of 1/1 to 1/10, has a coating weight of 0.5 to 20 g/m$^2$, and has a phosphophyllite ratio P/(P+H), based on phosphophyllite crystals (P) and hopeite crystals (H) therein, of from 0.1 to 1.

2. The friction member of claim 1, wherein the fibers of the fibrous base are selected from the group consisting of those of:

iron, copper, brass, bronze, aluminum, ceramic, potassium titanate, glass, carbon, rock wool, wollastonite, sepiolite, attapulgite, artificial mineral fibers, aramid, fibers, polyimide, polyamide, phenolic, cellulose, acrylic fibers and mixtures thereof.

3. The friction member of claim 1, wherein the fibrous base comprises from about 5 to about 90 wt % based on the total weight of the friction material.

4. The friction member of claim 1, wherein the binder is selected from the group consisting of:

phenolic resins, melamine resins, epoxy resins, rubber-modified phenolic resins, and mixtures thereof.

5. The friction member of claim 1, wherein the binder comprises from about 5 to about 50 wt %, based on the total weight of the friction material.

6. The friction member of claim 1, wherein the filler selected from the group consisting of:

molybdenum disulfide, antimony trisulfide, calcium carbonate, barium sulfate, magnesium oxide, cashew dust, graphite, calcium hydroxide, calcium fluoride, talc, molybdenum trioxide, antimony trioxide, zirconium silicate, iron oxide, mica, iron sulfide, zirconium oxide, metal powder, quartz, silicon dioxide, rubber dust, alumina, chromium oxide, vermiculite and mixtures thereof.

7. A friction member comprising:

a back plate, a non-asbestos friction material bonded to a surface of the back plate and produced by molding and curing a composition that includes a fibrous base, a binder and a filler, and a calcium zinc phosphate conversion coating formed between the back plate and the non-asbestos friction material;

wherein the conversion coating is composed of crystals having a maximum length of 0.1 to 50 μm and an aspect ratio of 1/1 to 1/10, and has a coating weight of 0.5 to 20 g/m².

8. A friction member comprising:

a back plate, a non-asbestos friction material bonded to a surface of the back plate and produced by molding and curing a composition that includes a fibrous base, a binder and a filler, and a metal phosphate conversion coating formed between the back plate and the non-asbestos friction material;

wherein the friction member, when new, has a breaking load, as measured in accordance with JIS D4422, of at least 9 MPa and a percent bonded surface area, defined as the ratio of the surface area of friction material attached to the back plate surface after shear to the surface area of friction material attached to the plate surface before shear, of at least 90% wherein the conversion coating is a zinc phosphate conversion coating which is composed of crystals having a maximum length of 0.1 to 50 μm and an aspect ratio of 1/1 to 1/10, has a coating weight of 0.5 to 20 g/m², and has a phosphophyllite ratio P/(P+H), based on phosphophyllite crystals (P) and hopeite crystals (H) therein, of from 0.1 to 1.

9. A friction member comprising:

a back plate, a non-asbestos friction material bonded to a surface of the back plate and produced by molding and curing a composition that includes a fibrous base, a binder and a filler, and a metal phosphate conversion coating formed between the back plate and the non-asbestos friction material;

wherein the friction member, after a 24-hour thermal history at 300° C., has a breaking load, as measured in accordance with JIS D4422, of at least 6 MPa and a percent bonded surface area, defined as the ratio of the surface area of friction material attached to the back plate surface after shear to the surface area of friction material attached to the plate surface before shear, of at least 50% wherein the conversion coating is a zinc phosphate conversion coating which is composed of crystals having a maximum length of 0.1 to 50 μm and an aspect ratio of 1/1 to 1/10, has a coating weight of 0.5 to 20 g/m², and has a phosphophyllite ratio P/(P+H), based on phosphophyllite crystals (P) and hopeite crystals (H) therein, of from 0.1 to 1.

10. A friction member comprising:

a back plate, a non-asbestos friction material bonded to a surface of the back plate and produced by molding and curing a composition that includes a fibrous base, a binder and a filler, and a metal phosphate conversion coating formed between the back plate and the non-asbestos friction material;

wherein the friction member, after a rusting test, has a breaking load, as measured in accordance with JIS D4422, of at least 7 MPa and a percent rusted surface area, defined as the ratio of rusted surface area on the back plate to the total surface area of the plate, of at most 10% wherein the conversion coating is a zinc phosphate conversion coating which is composed of crystals having a maximum length of 0.1 to 50 μm and an aspect ratio of 1/1 to 1/10, has a coating weight of 0.5 to 20 g/m², and has a phosphophyllite ratio P/(P+H), based on phosphophyllite crystals (P) and hopeite crystals (H) therein, of from 0.1 to 1.

11. A friction member comprising:

a back plate, a non-asbestos friction material bonded to a surface of the back plate and produced by molding and curing a composition that includes a fibrous base, a binder and a filler, and a metal phosphate conversion coating formed between the back plate and the nonasbestos friction material;

wherein the friction member, when new, has a breaking load, as measured in accordance with JIS D4422, of at least 9 MPa and a percent bonded surface area, defined as the ratio of the surface area of friction material attached to the back plate surface after shear to the surface area of friction material attached to the plate surface before shear, of at least 90% wherein the conversion coating is a calcium zinc phosphate conversion coating which is composed of crystals having a maximum length of 0.1 to 50 μm and an aspect ratio of 1/1 to 1/10, and has a coating weight of 0.5 to 20 g/m².

12. A friction member comprising:

a back plate, a non-asbestos friction material bonded to a surface of the back plate and produced by molding and curing a composition that includes a fibrous base, a binder and a filler, and a metal phosphate conversion coating formed between the back plate and the non-asbestos friction material;

wherein the friction member, after a 24-hour thermal history at 300° C., has a breaking load, as measured in accordance with JIS D4422, of at least 6 MPa and a percent bonded surface area, defined as the ratio of the surface area of friction material attached to the back plate surface after shear to the surface area of friction material attached to the plate surface before shear, of at least 50% wherein the conversion coating is a calcium zinc phosphate conversion coating which is composed of crystals having a maximum length of 0.1 to 50 μm and an aspect ratio of 1/1 to 1/10, and has a coating weight of 0.5 to 20 g/m².

13. A friction member comprising:

a back plate, a non-asbestos friction material bonded to a surface of the back plate and produced by molding and curing a composition that includes a fibrous base, a binder and a filler, and a metal phosphate conversion coating formed between the back plate and the non-asbestos friction material;

wherein the friction member, after a rusting test, has a breaking load, as measured in accordance with JIS D4422, of at least 7 MPa and a percent rusted surface area, defined as the ratio of rusted surface area on the back plate to the total surface area of the plate, of at most 10% wherein the conversion coating is a calcium zinc phosphate conversion coating which is composed of crystals having a maximum length of 0.1 to 50 μm and an aspect ratio of 1/1 to 1/10, and has a coating weight of 0.5 to 20 g/m$^2$.

14. The friction member according to any one of claims 11 to 13, wherein the conversion coating is a zinc phosphate conversion coating which is composed of crystals having a maximum length of 0.1 to 50 μm and an aspect ratio of 1/1 to 1/10, has a coating weight of 0.5 to 20 g/m$^2$, and has a phosphophyllite ratio P/(P+H), based on phosphophyllite crystals (P) and hopeite crystals (H) therein, of from 0.1 to 1.

15. A method of manufacturing friction members, the method comprising the steps of:

blasting a back plate to abrade it and remove rust therefrom;

forming a metal phosphate conversion coating on a surface of the blasted back plate; and bonding to the conversion treated surface of the back plate a non-asbestos friction material produced by molding and curing a composition that includes a fibrous base, a binder and a filler;

wherein (a) the surface of the back plate is prepared with a surface preparation agent prior to the conversion coating formation step, (b) a conversion treatment solution containing a reaction modifier is used in the conversion coating formation step, or both (a) and (b) are carried out wherein the surface preparation agent is a titanium colloid-based formulation having an alkalinity of 0.5 to 7 points.

wherein at least one ionic species selected from the group consisting of Ni$^{2+}$, F$^-$ and Mn$^{2+}$ is used as the reaction modifier to form a zinc phosphate conversion coating.

16. The friction member manufacturing method of claim 15, wherein Ni$^{2+}$ or Mn$^{2+}$ is used as the reaction modifier to form a calcium zinc phosphate conversion coating.

17. A method of manufacturing friction members, the method comprising the steps of:

blasting a back plate to abrade it and remove rust therefrom;

forming a metal phosphate conversion coating on a surface of the blasted back plate; and bonding to the conversion treated surface of the back plate a non-asbestos friction material produced by molding and curing a composition that includes a fibrous base, a binder and a filler;

wherein (a) the surface of the back plate is prepared with a surface preparation agent prior to the conversion coating formation step, (b) a conversion treatment solution containing a reaction modifier is used in the conversion coating formation step, or both (a) and (b) are carried out wherein the surface preparation agent is a titanium colloid-based formulation having an alkalinity of 0.5 to 7 points;

wherein the blasting step is carried out by using high-pressure air to blow a slurry composed of an aqueous degreaser, an aqueous cleaner and particles of a greater hardness than the back plate surface against one surface of the back plate to be bonded with the friction material, or against all surfaces of the back plate, so as to abrade and remove rust from the plate.

18. The friction member manufacturing method of claim 17, wherein the surface preparation agent is a titanium colloid-based formulation having an alkalinity of 0.5 to 7 points.

19. The friction member manufacturing method of claim 17, wherein at least one ionic species selected from the group consisting of Ni$^{2+}$, F$^-$ and Mn$^{2+}$ is used as the reaction modifier to form a zinc phosphate conversion coating.

* * * * *